US008845793B2

(12) United States Patent
Manahan et al.

(10) Patent No.: US 8,845,793 B2
(45) Date of Patent: *Sep. 30, 2014

(54) STRUCTURAL REINFORCEMENTS FOR FILTER ASSEMBLIES

(71) Applicant: Cooper Technologies Company, Houston, TX (US)

(72) Inventors: Joseph Michael Manahan, Manlius, NY (US); Graig E. DeCarr, Cicero, NY (US)

(73) Assignee: Cooper Technologies Company, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/025,663

(22) Filed: Sep. 12, 2013

(65) Prior Publication Data
US 2014/0013948 A1    Jan. 16, 2014

Related U.S. Application Data

(63) Continuation of application No. 13/331,724, filed on Dec. 20, 2011, now Pat. No. 8,562,722.

(60) Provisional application No. 61/426,427, filed on Dec. 22, 2010.

(51) Int. Cl.
*B01D 46/00* (2006.01)
*H05K 7/20* (2006.01)

(52) U.S. Cl.
CPC ........ *B01D 46/0005* (2013.01); *B01D 2265/04* (2013.01); *B01D 46/0093* (2013.01); *B01D 46/001* (2013.01); *B01D 2275/202* (2013.01)
USPC ............................................ 95/287; 361/695

(58) Field of Classification Search
USPC ................................... 95/287; 361/695; 55/48
See application file for complete search history.

(56) References Cited

U.S. PATENT DOCUMENTS

| | | | | |
|---|---|---|---|---|
| 2,772,120 A | * | 11/1956 | Olson | 239/462 |
| 2,801,768 A | | 8/1957 | Immel | |
| 3,001,606 A | | 9/1961 | Bierwirth et al. | |
| 4,113,627 A | * | 9/1978 | Leason | 210/446 |
| 4,229,306 A | | 10/1980 | Hein et al. | |
| 4,328,901 A | | 5/1982 | Gunderman et al. | |
| 4,484,690 A | | 11/1984 | Nash | |
| 5,032,156 A | * | 7/1991 | Luder et al. | 96/107 |
| RE34,308 E | | 7/1993 | Thompson et al. | |
| 5,741,351 A | | 4/1998 | Beal et al. | |
| 6,217,638 B1 | | 4/2001 | Van de Velde | |
| 6,331,674 B1 | | 12/2001 | Zolock et al. | |

(Continued)

FOREIGN PATENT DOCUMENTS

| | | |
|---|---|---|
| DE | 19904981 | 8/2000 |
| JP | 7068114 | 3/1995 |
| JP | 7068114 | 7/1995 |
| JP | 2003294285 | 10/2003 |

*Primary Examiner* — Amber Orlando
(74) *Attorney, Agent, or Firm* — King & Spalding LLP

(57) ABSTRACT

A filter assembly is described herein for controlling the air passing therethrough. The filter assembly can include a housing comprising a cavity formed therein. The filter assembly can also include a filter positioned within the cavity and coupled to the housing. Further, the filter assembly can include a reinforcement structure coupled to an end of the housing and adjacent to a top end of the filter.

20 Claims, 7 Drawing Sheets

(56) References Cited

U.S. PATENT DOCUMENTS

| | | |
|---|---|---|
| 6,383,241 B1 | 5/2002 | Janus et al. |
| 6,440,190 B1 | 8/2002 | Goyetche |
| 6,447,565 B1 | 9/2002 | Raszkowski et al. |
| 6,527,837 B2 | 3/2003 | Kurosawa et al. |
| 6,646,867 B1 | 11/2003 | Tuttle et al. |
| 6,708,834 B2 | 3/2004 | Hagerman, III |
| 6,817,940 B2 | 11/2004 | Pfannenberg |
| 6,852,141 B2 | 2/2005 | Bishop et al. |
| 6,882,523 B2 | 4/2005 | Turner et al. |
| 7,323,025 B2 | 1/2008 | Weidner |
| 7,413,089 B1 | 8/2008 | Tidwell |
| 7,625,277 B2 | 12/2009 | Palmer |
| 7,819,935 B2 | 10/2010 | Austin et al. |
| 7,931,725 B2 | 4/2011 | Wydeven et al. |
| 7,959,701 B2 | 6/2011 | Merritt |
| 8,087,980 B2 | 1/2012 | Palmer |
| 8,172,920 B2 | 5/2012 | Merritt |
| 8,246,707 B2 | 8/2012 | Xu et al. |
| 2003/0079448 A1 | 5/2003 | How et al. |
| 2003/0097935 A1 | 5/2003 | Burkhart |
| 2003/0126843 A1 | 7/2003 | Hsu |
| 2005/0013711 A1 | 1/2005 | Goyetche |
| 2005/0160911 A1 | 7/2005 | Friday et al. |
| 2007/0193236 A1 | 8/2007 | Merritt |
| 2008/0053906 A1 | 3/2008 | Kawai et al. |
| 2009/0165651 A1 | 7/2009 | Burgess et al. |
| 2009/0284381 A1 | 11/2009 | Manahan |
| 2010/0148643 A1 | 6/2010 | Fauveau |
| 2010/0258331 A1 | 10/2010 | Dahlgren et al. |
| 2010/0284150 A1 | 11/2010 | Manahan et al. |
| 2011/0197767 A1 | 8/2011 | Seitz |
| 2011/0308213 A1 | 12/2011 | Gillispie et al. |
| 2012/0160105 A1 | 6/2012 | Manahan et al. |

\* cited by examiner

STRUCTURAL REINFORCEMENTS FOR FILTER ASSEMBLIES

CROSS-REFERENCE TO RELATED APPLICATIONS

The present application is a continuation application of and claims priority to U.S. patent application Ser. No. 13/331,724, entitled "Structural Reinforcements For Filter Assemblies" and filed on Dec. 20, 2011, which claims priority to U.S. Provisional Patent Application No. 61/426,427, titled "Sintered Filters Having Structural Reinforcements" and filed on Dec. 22, 2010, in the names of Joseph Michael Manahan and Graig E. DeCarr. The entire contents of each of the foregoing applications are hereby incorporated herein by reference.

The present application also is related to U.S. patent application Ser. No. 13/331,270, entitled "Pre-Filtration and Maintenance Sensing For Explosion-Proof Enclosures" in the names of Joseph Michael Manahan and Graig E. DeCarr, filed on Dec. 20, 2011, the entire contents of which are hereby incorporated herein by reference.

TECHNICAL FIELD

The present disclosure relates generally to filter assemblies and more particularly to systems, methods, and devices for controlling air passing through the filter assembly using a structural reinforcement coupled to a housing of the filter assembly.

BACKGROUND

Explosion-proof receptacle housings and enclosure systems are used in many different industrial applications. Such explosion-proof receptacle housing and enclosure systems may be used, for example, in military applications, onboard ships, assembly plants, power plants, oil refineries, petrochemical plants, and other harsh environments. At times, the equipment located inside such explosion-proof receptacle housing and enclosure systems are used to control motors and other industrial equipment.

Traditional motor starters and related equipment fail to provide adequate torque control and result in excessive wear on the motor and associated equipment. Instead, variable frequency drives (VFDs) are often used in place of traditional motor starters. However, VFDs tend to generate heat and are subject to failure when exposed to excessive temperatures caused by the heat loss. A common practice to reduce heat-related problems is to remove the VFD to a remote location so that an explosion-proof receptacle housing and enclosure system is not required, allowing proper cooling of the VFD during operation. However, installation costs may increase and operational problems may result from increased line losses from the added distance that signals between the VFD and the related equipment must travel. Accordingly, improved enclosures for VFDs and other equipment are needed.

SUMMARY

In general, in one aspect, the disclosure relates to a filter assembly for controlling the air passing therethrough. The filter assembly can include a housing comprising a cavity formed therein. The filter assembly can also include a filter positioned within the cavity and coupled to the housing. Further, the filter assembly can include a reinforcement structure coupled to an end of the housing and adjacent to a top end of the filter.

In another aspect, the disclosure can generally relate to a method for controlling air passing through a filter assembly. The method can include receiving the air at a first filter assembly end. The method can also include passing the air through the filter assembly to generate controlled air. Further, the method can include passing the controlled air through a second filter assembly end. The filter assembly used to perform the method can include a housing comprising a cavity formed therein, a filter positioned within the cavity and coupled to the housing, and a reinforcement structure coupled to a housing end and adjacent to a filter end.

These and other aspects, objects, features, and embodiments of the present invention will be apparent from the following description and the appended claims.

BRIEF DESCRIPTION OF THE DRAWINGS

The drawings illustrate only exemplary embodiments of the invention and are therefore not to be considered limiting of its scope, as the invention may admit to other equally effective embodiments. The elements and features shown in the drawings are not necessarily to scale, emphasis instead being placed upon clearly illustrating the principles of the exemplary embodiments. Additionally, certain dimensions or positionings may be exaggerated to help visually convey such principles. In the drawings, reference numerals designate like or corresponding, but not necessarily identical, elements.

DETAILED DESCRIPTION

Figure 1:
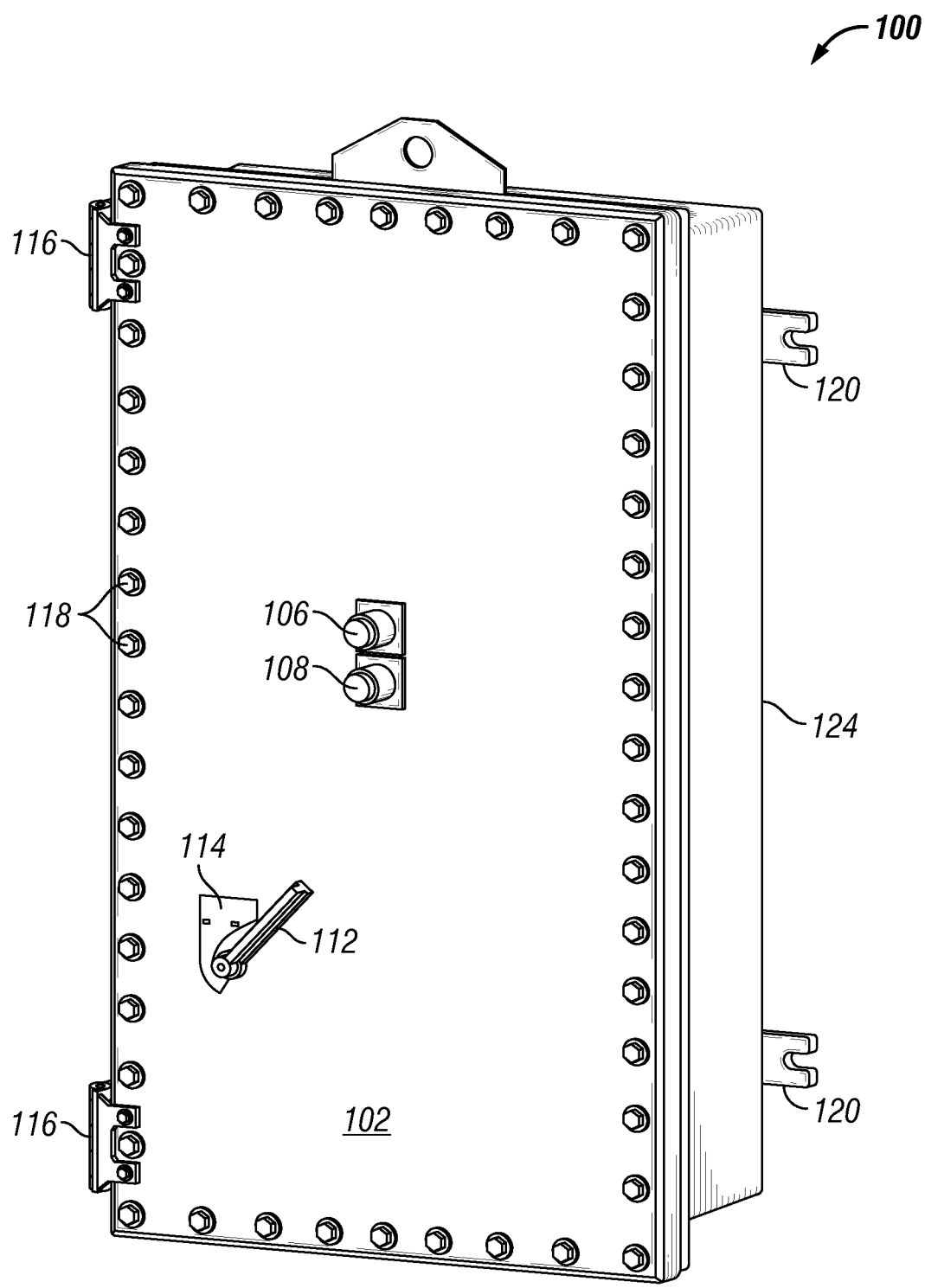
FIGS. 1 and 2 show explosion-proof enclosures in which one or more embodiments of the invention may be implemented.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description. Further, certain descriptions (e.g., top, bottom, side, end, interior, inside) are merely intended to help clarify aspects of the invention and are not meant to limit embodiments of the invention.

In general, embodiments of the invention provide systems, methods, and devices for filter assemblies used with enclosures. Specifically, embodiments of the invention provide for controlling air passing through a filter assembly coupled to an enclosure. A filter assembly may be used to control air passing from outside the enclosure to inside the enclosure. A filter assembly may also, or in the alternative, be used to control air passing from inside the enclosure to outside the enclosure.

While the exemplary embodiments discussed herein are with reference to explosion-proof enclosures, other types of non-explosion-proof enclosures (e.g., junction boxes, control panels, lighting panels, motor control centers, switchgear cabinets, relay cabinets) or any other type of enclosure may be used in conjunction with embodiments of the invention.

A user may be any person that interacts with the enclosure or equipment controlled by one or more components of the enclosure. Examples of a user may include, but are not limited to, an engineer, an electrician, an instrumentation and controls technician, a mechanic, an operator, a consultant, a contractor, and a manufacturer's representative.

In one or more exemplary embodiments, an explosion-proof enclosure (also known as a flame-proof enclosure) is an enclosure that is configured to contain an explosion that originates inside the enclosure. Further, the explosion-proof enclosure is configured to allow gases from inside the enclosure to escape across joints of the enclosure and cool as the gases exit the explosion-proof enclosure. The joints are also known as flame paths and exist where two surfaces meet and provide a path, from inside the explosion-proof enclosure to outside the explosion-proof enclosure, along which one or more gases may travel. A joint may be a mating of any two or more surfaces. Each surface may be any type of surface, including but not limited to a flat surface, a threaded surface, and a serrated surface.

In one or more exemplary embodiments, an explosion-proof enclosure is subject to meeting certain standards and/or requirements. For example, the NEMA sets standards by which an enclosure must comply in order to qualify as an explosion-proof enclosure. Specifically, NEMA Type 7, Type 8, Type 9, and Type 10 enclosures set standards by which an explosion-proof enclosure within a hazardous location must comply. For example, a NEMA Type 7 standard applies to enclosures constructed for indoor use in certain hazardous locations. Hazardous locations may be defined by one or more of a number of authorities, including but not limited to the National Electric Code (e.g., Class 1, Division I) and Underwriters' Laboratories, Inc. (UL) (e.g., UL 698). For example, a Class 1 hazardous area under the National Electric Code is an area in which flammable gases or vapors may be present in the air in sufficient quantities to be explosive.

As a specific example, NEMA standards for an explosion-proof enclosure of a certain size or range of sizes may require that in a Group B, Division 1 area, any flame path of an explosion-proof enclosure must be at least 1 inch long (continuous and without interruption), and the gap between the surfaces cannot exceed 0.0015 inches. Standards created and maintained by NEMA may be found at www.nema.org/stds and are hereby incorporated by reference.

Figure 2:
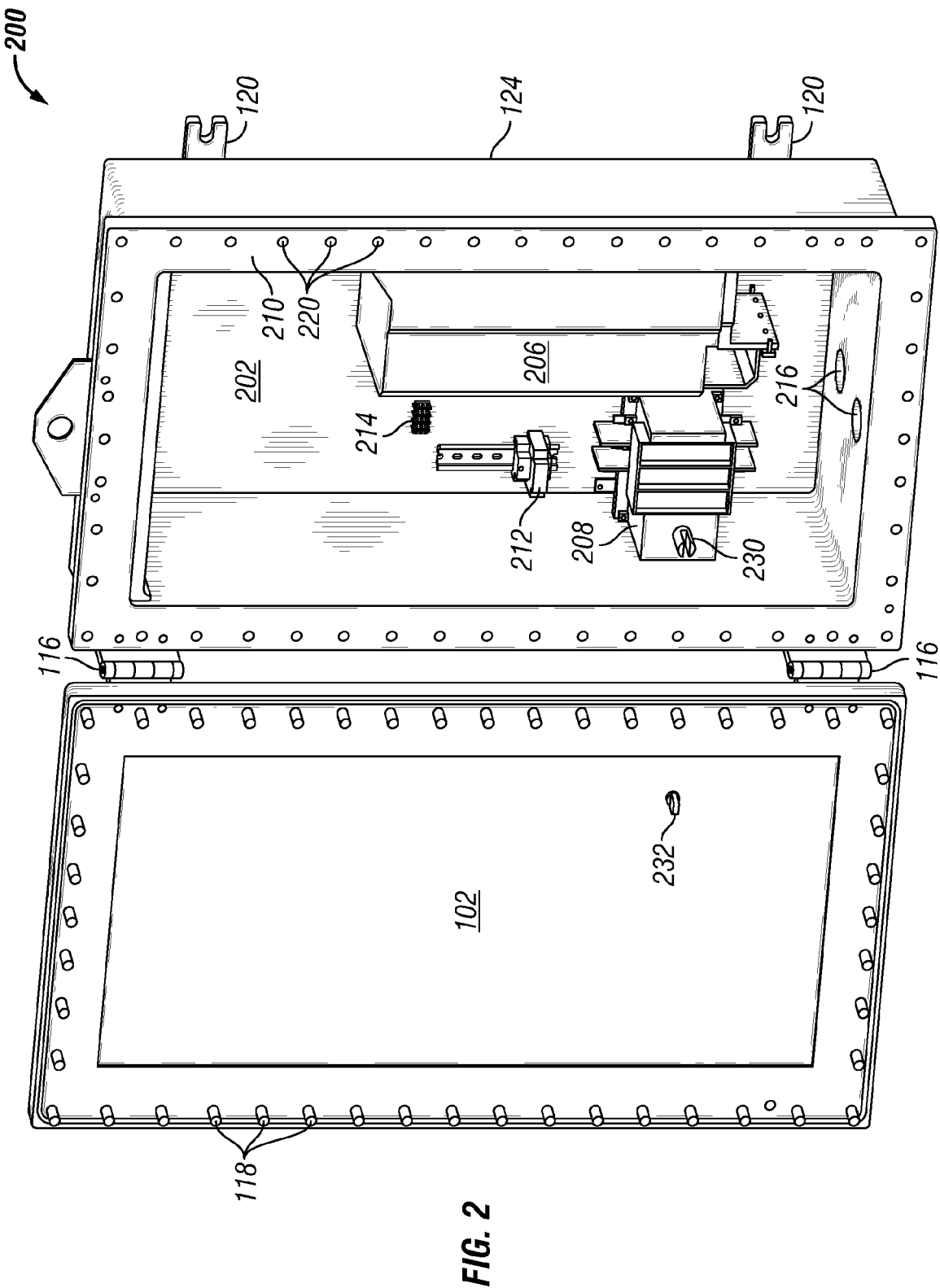

FIGS. 1 and 2 depict an explosion-proof enclosure 100 in which one or more embodiments of the invention may be implemented. In one or more embodiments, one or more of the components shown in FIGS. 1 and 2 may be omitted, repeated, and/or substituted. Accordingly, embodiments of an explosion-proof enclosure should not be considered limited to the specific arrangements of components shown in FIGS. 1 and 2.

Referring now to FIG. 1, an example of an explosion-proof enclosure 100 in a closed position is shown. The enclosure cover 102 is secured to the enclosure body 124 by a number of fastening devices 118 located at a number of points around the perimeter of the enclosure cover 102. In one or more embodiments, a fastening device 118 may be one or more of a number of fastening devices, including but not limited to a bolt (which may be coupled with a nut), a screw (which may be coupled with a nut), and a clamp. In addition, one or more hinges 116 are secured to one side of the enclosure cover 102 and a corresponding side of the enclosure body 124 so that, when all of the fastening devices 118 are removed, the enclosure cover 102 may swing outward (i.e., an open position) from the enclosure body 124 using the one or more hinges 116. In one or more exemplary embodiments, there are no hinges, and the enclosure cover 102 is separated from the enclosure body 124 when all of the fastening devices 118 are removed.

The enclosure cover 102 and the enclosure body 124 may be made of any suitable material, including metal (e.g., alloy, stainless steel), plastic, some other material, or any combination thereof. The enclosure cover 102 and the enclosure body 124 may be made of the same material or different materials.

In one or more embodiments, on the end of the enclosure body 124 opposite the enclosure cover 102, one or more mounting brackets 120 are affixed to the exterior of the enclosure body 124 to facilitate mounting the enclosure 100. Using the mounting brackets 120, the enclosure 100 may be mounted to one or more of a number of surfaces and/or elements, including but not limited to a wall, a control cabinet, a cement block, an I-beam, and a U-bracket.

The enclosure cover 102 may include one or more features that allow for user interaction while the enclosure 100 is sealed in the closed position. As shown in FIG. 1, one or more indicating lights (e.g., indicating light 1 106, indicting light 2 108) may be located on the enclosure cover 102. Each indicating light may be used to indicate a status of a feature or process associated with equipment inside the enclosure 100. For example, an indicating light may show a constant green light if a motor controlled by a VFD inside the enclosure 100 is operating. As another example, an indicating light may flash red when a motor controlled by a VFD inside the enclosure 100 has a problem (e.g., tripped circuit, VFD overheats, overcurrent situation). As another example, an indicating light may show a constant red light when an electromagnetic pulse caused by an explosion inside the enclosure 100 has resulted. An indicating light may be made of one or more materials (e.g., glass, plastic) using one or more different lighting sources (e.g., light-emitting diode (LED), incandescent bulb).

In one or more embodiments, the enclosure cover 102 may also include a switch handle 112 that allows a user to operate a switch (not shown) located inside the explosion-proof enclosure 100 while the explosion-proof enclosure 110 is closed. Those skilled in the art will appreciate that the switch handle 112 may be used for any type of switch. Each position (e.g., OFF, ON, HOLD, RESET) of the switch may be indicated by a switch position indicator 114 positioned adjacent to the switch handle 112 on the outer surface of the enclosure cover 102. A switch associated with the switch handle 112 and the switch position indicator 114 may be used to electrically and/or mechanically isolate, and/or change the mode of operation of, one or more components inside or associated with the explosion-proof enclosure 100. For example, the switch handle 112 may point to "OFF" on the switch position indicator 114 when a disconnect switch located inside the explosion-proof enclosure 100 is disengaged. In such a case, all equipment located inside the explosion-proof enclosure 100, as well as the equipment (e.g., a motor) controlled by the equipment located inside the explosion-proof enclosure 100, may be without power.

Referring now to FIG. 2, an example of an explosion-proof enclosure 100 in an open position in accordance with one or more embodiments is shown. The explosion-proof enclosure 100 is in the open position because the enclosure cover (not shown) is not secured to the enclosure body 124. The hinges 116 attached to the left side of the enclosure body 124 are also attached to the left side of the enclosure cover, which is swung outward from the enclosure body 124. Because the explosion-proof enclosure 100 is in the open position, the components of the explosion-proof enclosure 100 are visible to a user.

As described above with respect to FIG. 1, the enclosure body 124 includes two or more mounting brackets 120. In addition, in one or more embodiments, the enclosure body 124 includes an enclosure engagement surface 210, against which the enclosure cover meets when the explosion-proof enclosure 100 is in the closed position. A number of fastening device apertures 220 are shown around the enclosure engagement surface 210, where each of the fastening device apertures 220 are configured to receive a fastening device 118 that traverses through the enclosure cover 102, as described above with respect to FIG. 1. The number of fastening device apertures 220 may vary, depending on one or more of a number of factors, including but not limited to the size of the fastening device apertures 220, a standard that the explosion-proof enclosure 100 meets, and the type of fastening device 118 used. The number of fastening device apertures 220 may be zero.

In one or more embodiments, the explosion-proof enclosure 100 of FIG. 2 includes a mounting plate 202 that is affixed to the back of the inside of the explosion-proof enclosure 100. The mounting plate 202 may be configured to receive one or more components such that the one or more components are affixed to the mounting plate 202. The mounting plate 202 may include one or more apertures configured to receive securing devices that may be used to affix a component to the mounting plate 202. The mounting plate 202 may be made of any suitable material, including but not limited to the material of the enclosure body 124. In one or more exemplary embodiments, some or all of the one or more components may be mounted directly to an inside wall of the explosion-proof enclosure 100 rather than to the mounting plate 202.

In one or more embodiments, a VFD 206 is affixed to the mounting plate 202 inside the explosion-proof enclosure 100. The VFD 206 may include any components used to drive a motor and/or other device using variable control signals for controlled starts, stops, and/or operations of the motor and/or other devices. Examples of components of a VFD include, but are not limited to, discrete relays, a programmable logic controller (PLC), a programmable logic relay (PLR), an uninterruptible power supply (UPS), and a distributed control system (DSC). In one or more exemplary embodiments, one or more components of the VFD may replace the VFD. For example, the VFD may be substituted by one or more PLCs, one or more PLRs, one or more UPSs, one or more DCSs, and/or other heat-generating components.

In one or more embodiments, a switch 208 is affixed to the mounting plate 202 inside the explosion-proof enclosure 100. The switch 208 may be configured to electrically and/or mechanically isolate, and/or change the mode of operation of, one or more components located inside the explosion-proof enclosure 100 and/or one or more components located outside the explosion-proof enclosure 100. The switch 208 may be any type of switch, including but not limited to a disconnect switch, a test switch, a reset switch, an indicator switch, and a relay switch. For example, the switch 208 may be a disconnect switch that is used to cut off power to all components in the explosion-proof enclosure 100 and all devices located outside the explosion-proof enclosure 100 that are controlled by the components inside the explosion-proof enclosure 100. As another example, the switch 208 may be a bypass switch that is used to deactivate a protection scheme (e.g., a relay) or some other particular component or group of components located inside the explosion-proof enclosure 100.

The switch 208 may further be configured to receive, through mechanical and/or electrical means, a directive to change states (e.g., open, closed, hold) from a component located on the enclosure cover. For example, if the enclosure cover includes a switch handle (as described above with respect to FIG. 1), then a switch handle shaft 232 may extend from the switch handle through the enclosure cover to a switch coupling 230 of the switch 208. When the explosion-proof enclosure 100 is in the closed position, the switch handle shaft 232 couples with the switch coupling 230, and switch 208 may be operated by operating the switch handle located outside the explosion-proof enclosure, as described above with respect to FIG. 1.

In one or more embodiments, one or more relays (e.g., relay 212) are affixed to the mounting plate 202 inside the explosion-proof enclosure 100. A relay 212 may be configured to control one or more operations of one or more components located in, or associated with, the explosion-proof enclosure 100. Specifically, a relay 212 may, through one or more relay contacts, allow electrical current to flow and/or stop electrical current from flowing to one or more components in the enclosure 100 based on whether a coil of the relay 212 is energized or not. For example, if the coil of the relay 212 is energized, then a contact on the relay may be closed to allow current to flow to energize a motor. The relay 212 may be activated based on a timer, a current, a voltage, some other suitable activation method, or any combination thereof. The relay 212 may also be configured to emit a signal when a condition has occurred. For example, the relay 212 may flash a red light to indicate that the VFD 206 is in an alarm state.

In one or more embodiments, wiring terminals 214 are affixed to the mounting plate 202 inside the explosion-proof enclosure 100. Wiring terminals 214 are a series of terminals where one terminal is electrically connected to at least one other terminal in the series of terminals while remaining electrically isolated from the remaining terminals in the series of terminals. In other words, two or more terminals among the series of terminals act as a junction point where multiple wires may be electrically connected through the joined terminals.

In one or more embodiments, one or more entry holes 216 may extend through one or more sides (e.g., bottom) of the enclosure body 124. Each entry hole 216 may be configured to allow cables and/or wiring for power, control, and/or communications to pass through from outside the explosion-proof enclosure 100 to one or more components inside the explosion-proof enclosure 100. An entry hole 216 may be joined with a conduit and coupling from outside the explosion-proof enclosure 100 to protect the cables and/or wiring received by the entry hole 216 and to help maintain the integrity of the explosion-proof enclosure 100 through the entry hole 216.

Figure 3A:
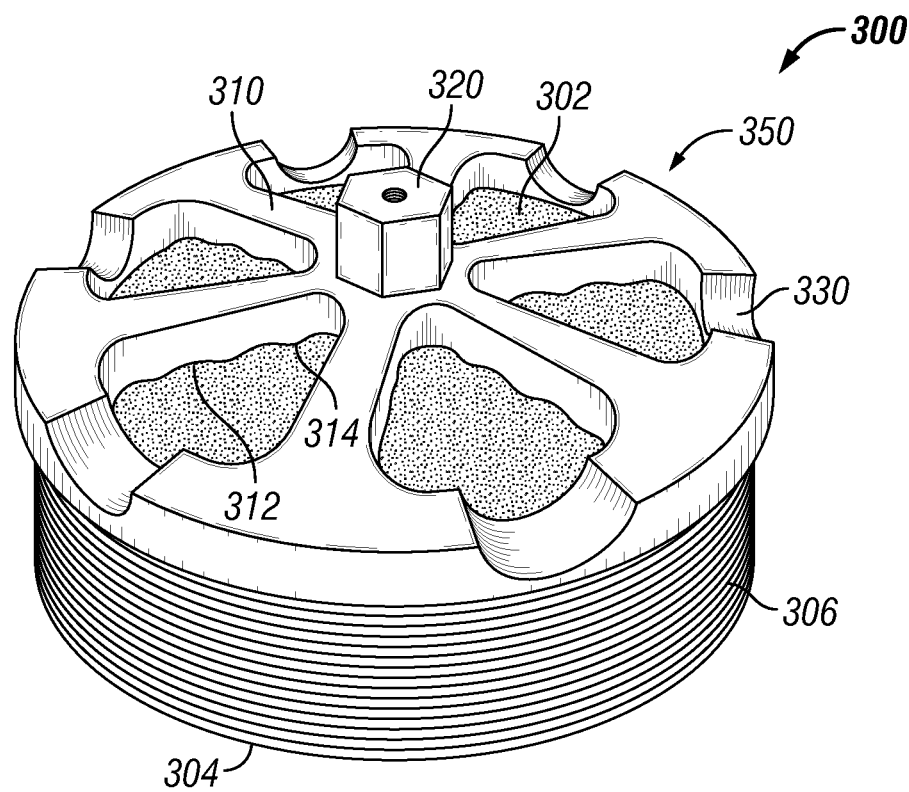
FIGS. 3A through 3C show various views of a filter assembly in accordance with one or more embodiments of the invention.
Figure 3B:
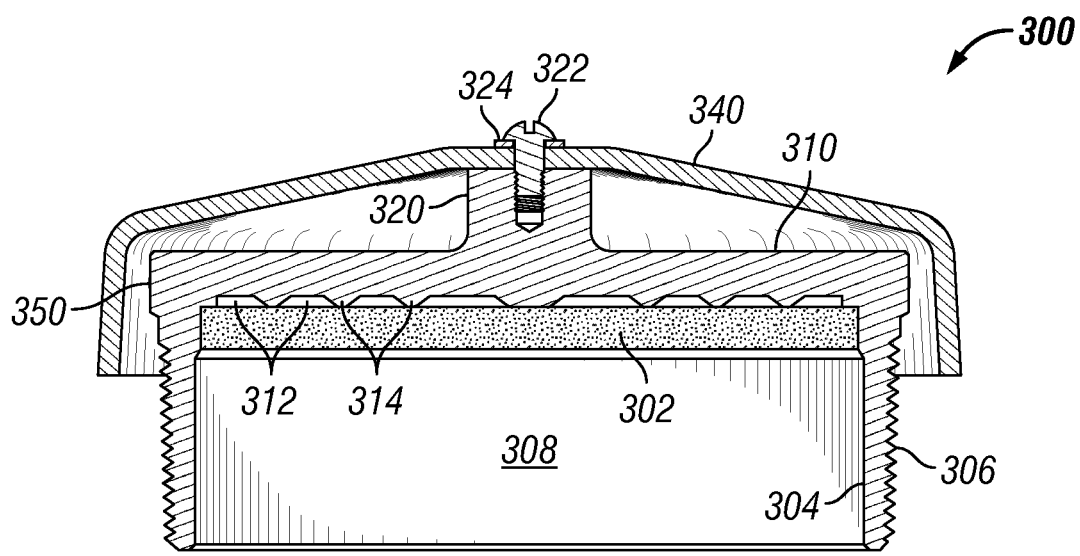
Figure 3C:
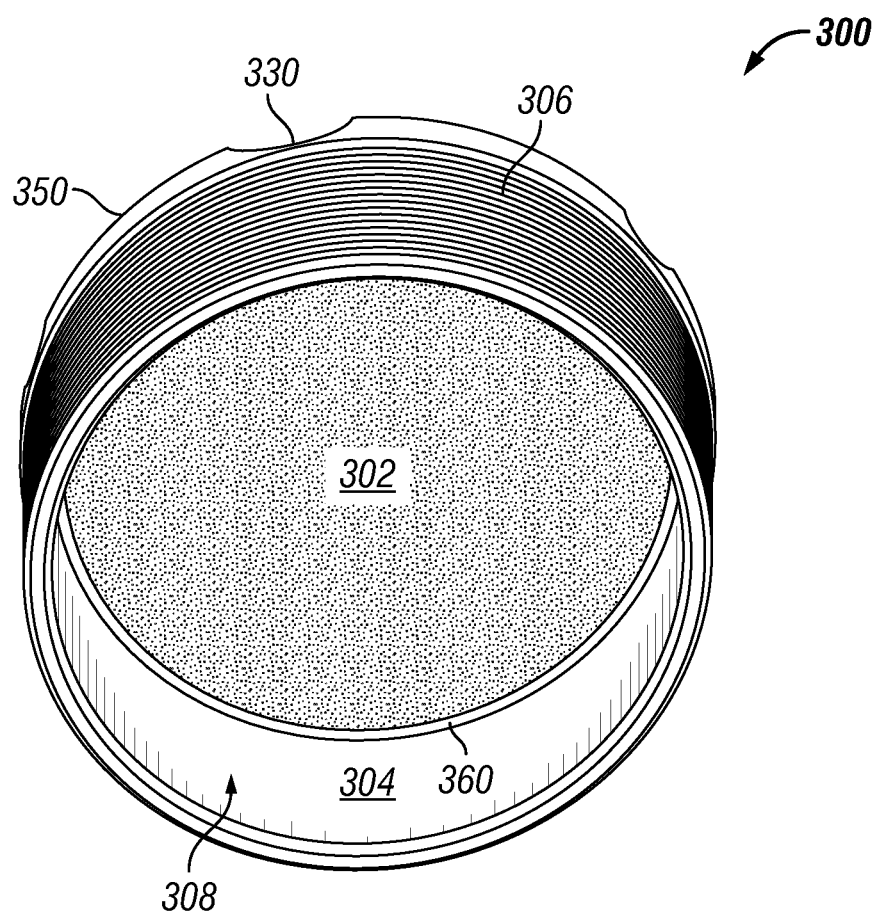

FIGS. 3A through 3C show various views of a filter assembly 300 in accordance with one or more embodiments of the invention. Specifically, FIG. 3A shows a top view of a filter assembly 300; FIG. 3B shows a cross-sectional side view of a filter assembly 300; and FIG. 3C shows a bottom view of a filter assembly 300. Each of these views of the filter assembly 300 is described below. Embodiments of the invention are not limited to the configurations shown in FIGS. 3A through 3C and discussed herein. For example, while the embodiments shown in FIG. 3A through 3C show that the outer surface of the housing 304 has threads 306 used to couple the filter assembly 300 to an aperture in the enclosure body, the filter assembly 300 may be coupled to the enclosure body in one or more other manners, including but not limited to bolting, welding, using epoxy, brazing, press fitting, mechanically connecting, using a flat joint, and using a serrated joint.

In FIG. 3A, the top view of a filter assembly 300 shows a filter 302 and a reinforcement structure 350 coupled to a housing 304 that has threads 306 on the outer surface of the housing. In one or more exemplary embodiments, the top of the filter assembly 300 coincides with the location of the reinforcement structure 350. Further, the top of the filter 302 and the top of the housing 304 may be adjacent to the top of the filter assembly 300. The threads 306 may be used to couple the filter assembly 300 to a filter aperture in the enclosure body.

In one or more exemplary embodiments, the filter assembly 300 is configured to allow air to pass between the outside of the explosion-proof enclosure and the inside of the explosion-proof enclosure. When ambient air passes from outside the explosion-proof enclosure to inside the explosion-proof enclosure, the ambient air passes through an intake air filter assembly. When exhaust air passes from inside the explosion-proof enclosure to outside the explosion-proof enclosure, the exhaust air passes through an exhaust air filter assembly. The intake air filter assembly and the exhaust air filter assembly may be located on opposite sides (e.g., bottom and top, respectively) of the explosion-proof enclosure. The intake air filters assemblies may be positioned to increase or optimize the cooling effects of the intake air on the heat-generating components. In one or more exemplary embodiments, the intake air filter assemblies are positioned at the bottom of the explosion-proof enclosure, as shown below in FIG. 6A.

In one or more exemplary embodiments, the filter assembly 300 is further configured to control the air that passes through the filter assembly 300. Specifically, the filter assembly 300 may further be configured to contain a fire, suppress a fire, remove dust and other particles from the air, remove moisture from the air, and/or cool the air that enters and/or exits the explosion-proof enclosure. In one or more exemplary embodiments, the filter 302 is shaped in a manner to fit snugly inside the cavity (not shown) of the housing 304 and underneath the reinforcement structure 350 without significant gaps between the filter 302 and the housing 304. Any such gaps between the filter 302 and the housing 304 may be required to comply with one or more standards for explosion-proof joints. The filter 302 may be made of one or more materials, including but not limited to sintered material, paper, ceramic, rubber, steel, aluminum, plastic, an alloy metal, some other suitable material, or any combination thereof.

The filter 302 may have a density sufficient to allow a minimal amount of air to pass through the filter assembly 300. For example, the filter 302 may have a density sufficient to allow at least 0.01 cubic feet per minute of the air to pass through the filter assembly 300. Further, the filter 302 may be able to withstand high temperatures and occasional situations where a fire exists in an area proximate to the filter 302.

The reinforcement structure 350 of the filter assembly 300 shown in FIG. 3A includes a number of reinforcement ribs 310 and a notch 330 along the perimeter of the reinforcement structure 350 between two adjacent reinforcement ribs 310. The notch 330 may be configured to allow fluid that accumulates on the top of the filter to drain along the side of the filter assembly 300. In a preferred embodiment, while the top and sides of each reinforcement rib 310 are flat, the underside of each reinforcement rib 310 has an undulating configuration, alternating between a rib contact 314 and an air gap 312. Each rib contact 314 makes physical contact with the top of the filter 302, while each air gap 312 provides a gap between the bottom of the reinforcement rib 310 and the top of the filter 302.

In FIG. 3A, each reinforcement rib 310 has three rib contacts 314 and four air gaps 312 that are spaced equally. Those skilled in the art will recognize that the shape of the underside of the reinforcement rib 310, as well as the number of rib contacts 314 and air gaps 312 (and the spacing therebetween) on each reinforcement rib 310, may vary in embodiments of the invention. In the exemplary embodiment illustrated herein, the shape of the underside of the reinforcement rib 310 is designed to facilitate air flow. Further, each reinforcement rib 310 may be configured differently from other reinforcement ribs 310 in a reinforcement structure 350 in one or more embodiments of the invention. In one or more embodiments of the invention, the top and/or sides of the reinforcement ribs 310 may be any shape other than flat.

In addition, in the configuration of the reinforcement structure 350 shown in FIG. 3A, the six reinforcement ribs 310 are joined in the center of the perimeter of the reinforcement structure 350 atop the filter 302. Specifically, a boss 320 is positioned at the top center of the reinforcement structure 350 where the reinforcement ribs 310 join. In one or more embodiments of the invention, the boss 320 is configured to facilitate rotational movement of the filter assembly 300. The boss 320 may also be configured to receive a fastening device. The fastening device may be used to secure a component of the explosion-proof enclosure to the filter assembly 300. For example, a fastening device may be used to secure a shroud (shown below in FIG. 3B) to the filter assembly 300, where the shroud is configured to cover portions of the filter assembly 300 that are external (i.e., exposed) to the explosion-proof enclosure.

The boss 320 shown in FIG. 3A has a hexagonal shape. Those skilled in the art will appreciate that the boss 320 may be any shape and size to perform the functions of joining two or more reinforcement ribs 310, facilitate rotational movement of the filter assembly 300, receive a fastening device, and/or perform any other function that may be performed by the boss 320.

In one or more embodiments of the invention, the reinforcement structure 350 is configured to prevent or significantly reduce deformation of the filter 302. Specifically, the reinforcement structure 350 may prevent filter deflection in the event of an explosion inside the explosion-proof enclosure. As a result, the reinforcement structure 350 may be positioned on the opposite side of the filter from where a pressure and/or force is generated (e.g., facing away from the explosion-proof enclosure to minimize the effects of an explosion inside the explosion-proof enclosure). The reinforcement structure 350 may be constructed of any material suitable for performing such a task, including but not limited to steel, aluminum, plastic, an alloy metal, some other material, or any combination thereof.

The filter 302, when coupled with the reinforcement structure 350, may be configured to withstand a minimal amount of pressure for a period of time. For example, the filter 302 combined with the reinforcement structure 350 may be able to withstand a pressure of up to 560 pounds per square inch (psi) for at least three seconds. As another example, in compliance with UL standards, the filter 302 combined with the reinforcement structure 350 may be able to withstand a pressure of at least 1,777 psi (compared to a target pressure of 280 psi) for at least ten seconds.

Further, the filter 302, when coupled with the reinforcement structure 350 and the housing 304, may be configured to withstand a minimal temperature. For example, the filter 302 combined with the reinforcement structure 350 and the housing 304 (i.e., the filter assembly 300) may be configured to operate in a steady-state temperature of up to 421° C. and in an instantaneous temperature of up to 550° C. Those skilled in the art will appreciate that one or more of a number of variables (e.g., explosive gas present, filter assembly configuration, filter assembly material, filter material) may contribute to increasing or decreasing the steady-state and instantaneous operating temperatures of the filter assembly.

In one or more embodiments of the invention, the reinforcement structure 350 is securely coupled to the housing 304. The reinforcement structure 350 may be coupled to the housing 304 using one or more of a number of methods, including but not limited to welding, using epoxy, brazing, press fitting, mechanically connecting, threading, using a flat joint, and using a serrated joint. In one or more embodiments of the invention, the reinforcement structure 350 and the housing 304 are a single piece.

The reinforcement structure 350 may be configured to have outer dimensions (e.g., diameter) that are slightly larger than the outer dimensions of the housing 304, so that the reinforcement structure 350 appears to protrude slightly from the housing 304 when looking at a side view of the filter assembly 300. Alternatively, the reinforcement structure 350 may be configured to have substantially the same outer dimensions as the housing 304, so that the reinforcement structure 350 and the housing 304 appear flush from a side view of the filter assembly 300.

A cross-sectional side view of the filter assembly 300 of FIG. 3A is shown in FIG. 3B. Specifically, the housing 304 is shown with a number of threads 306 on the outer portion of the housing 304 and a smooth inner surface. The cavity 308 fills the space inside the housing 304 up to the filter 302. The thickness of the filter 302 may vary, depending upon one or more of a number of factors, including but not limited to the material of the filter 302, the temperature of the air, the pressure of the air, and the amount of air flow required.

The reinforcement structure 350 in FIG. 3B shows two reinforcement ribs 310, each having three rib contacts 314 with the filter 302 as well as a rib contact along the perimeter of the reinforcement structure 350 and in the center of the reinforcement structure 350 where the reinforcement ribs 310 meet. While the three rib contacts 312 along the reinforcement ribs 310 are of the same shape and size, the other rib contacts (i.e., along the perimeter of the reinforcement structure 350 and in the center of the reinforcement structure 350) are of different shapes and sizes.

Further, FIG. 3B shows four air gaps 312 under each reinforcement rib 310. The middle two air gaps are approximately the same shape and size. However, the outer air gaps are each of a different shape and size compared to the middle two air gaps and compared to the other outer air gap.

In addition, a shroud 340 is shown coupled to the boss 320 of the reinforcement structure 350 by a fastening device 322 and a washer 324. The shroud 340 may be configured to protect the reinforcement structure 350 of the filter assembly 300 from water, dirt, and/or other elements outside the explosion-proof enclosure while still allowing air to flow into and/or out of the filter assembly 300.

FIG. 3C shows a bottom view of the filter assembly 300 described above with respect to FIGS. 3A and 3B. Specifically, the housing 304 is shown to have a smooth inner surface and threads 306 on the outer surface. The reinforcement structure 350 is coupled to the housing 304, and a notch 330 along the outer perimeter of the reinforcement structure 350 is visible.

In addition, the filter 302 is shown inside the housing 304. Specifically, the filter 302 is affixed to the housing 304 by a coupling 360. In this case, the coupling 360 is welding that runs along the entire perimeter of the bottom end (i.e., the portion of the filter 302 that is exposed to the cavity 308 in the housing 304) of the filter 302 where the filter 302 meets the inner surface of the housing 304. The filter may be coupled to the housing in one or more of a number of ways, including but not limited to welding, using epoxy, brazing, press fitting, mechanically connecting, threading, using a flat joint, and using a serrated joint.

Figure 4A:
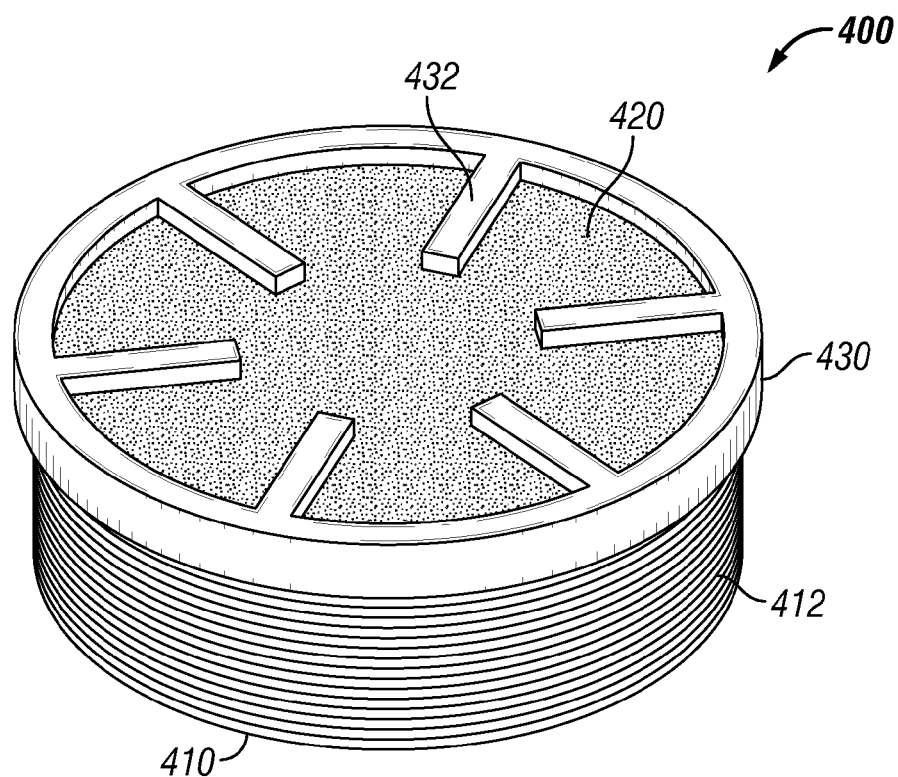
FIGS. 4A and 4B show various embodiments of a filter assembly in accordance with one or more embodiments of the invention.
Figure 4B:
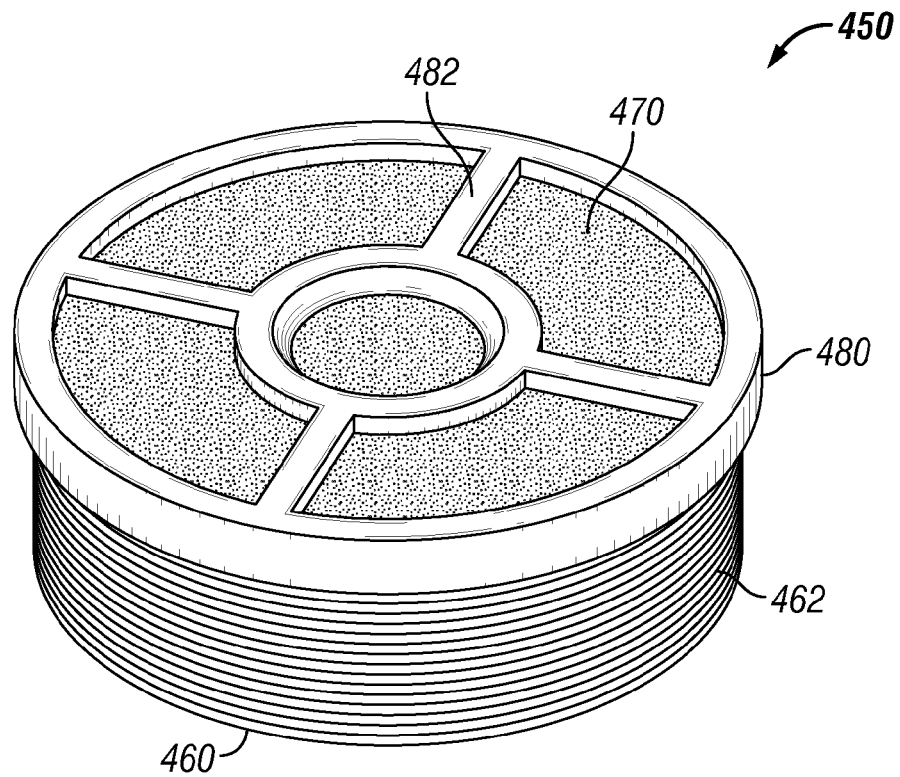

FIGS. 4A and 4B show other configurations of a reinforcement structure for a filter assembly. In FIG. 4A, the housing 410 of the filter assembly 400 includes threads 412 on the outer surface of the housing 410. Further, the filter 420 is coupled to the housing 410 and is positioned just below the reinforcement structure 430. The reinforcement structure 430 has six reinforcement ribs 432 that each extend inward toward the center of the perimeter along the top end of the filter 420. However, unlike the configuration shown in FIGS. 3A and 3B, the reinforcement ribs 432 of FIG. 4A do not join but rather end without touching each other.

In FIG. 4B, the housing 460 of the filter assembly 450 includes threads 462 on the outer surface of the housing 460. Further, the filter 470 is coupled to the housing 460 and is positioned just below the reinforcement structure 480. The reinforcement structure 480 has four reinforcement ribs 482 that each extend inward toward the center of the perimeter along the top end of the filter 470. In this example, the four reinforcement ribs 482 meet at a circular configuration that is centered at the center of the perimeter along the top end of the filter 470.

Figure 5:
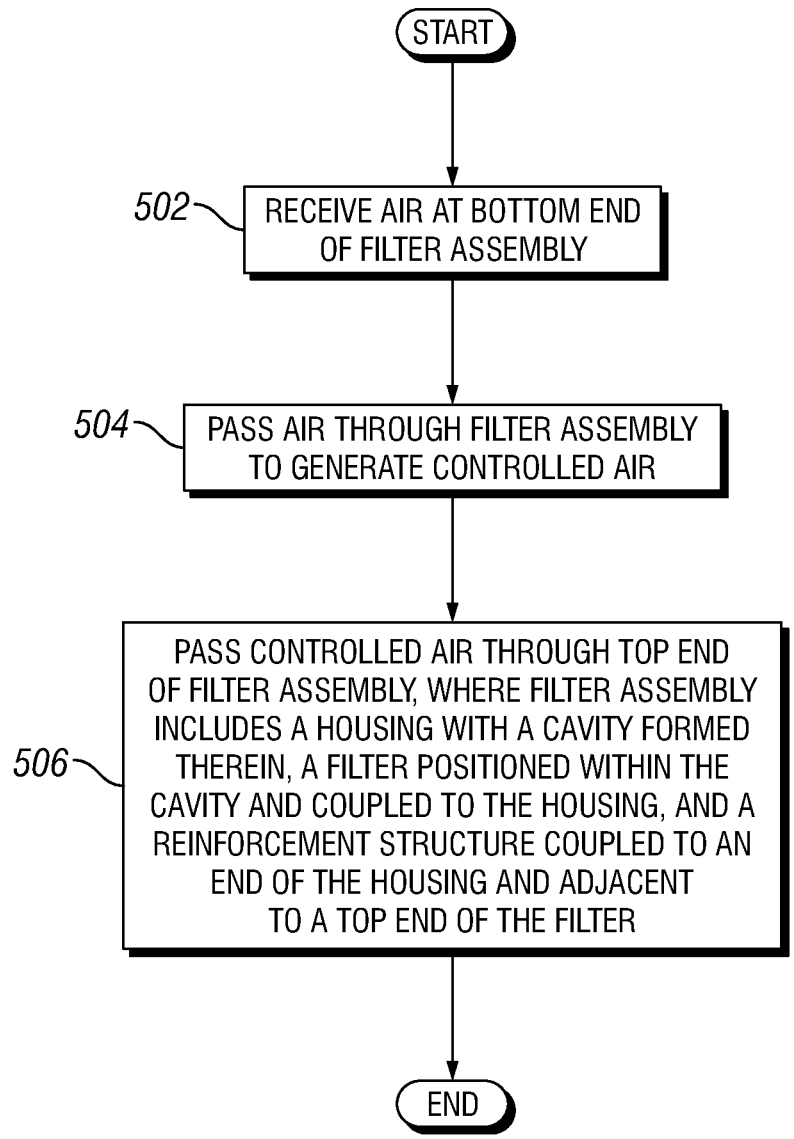
FIG. 5 shows a flowchart of a method in accordance with one or more embodiments of the invention.

FIG. 5 shows a flowchart of a method for controlling air passing through a filter assembly in accordance with one or more embodiments of the invention. While the various steps in this flowchart are presented and described sequentially, one of ordinary skill will appreciate that some or all of the steps may be executed in different orders, may be combined or omitted, and some or all of the steps may be executed in parallel. Further, in one or more of the embodiments of the invention, one or more of the steps described below may be omitted, repeated, and/or performed in a different order. In addition, a person of ordinary skill in the art will appreciate that additional steps, omitted in FIG. 5, may be included in performing this method. Accordingly, the specific arrangement of steps shown in FIG. 5 should not be construed as limiting the scope of the invention.

In Step 502, air is received at the bottom end of the filter assembly. In one or more embodiments, the filter assembly is coupled to an enclosure. The enclosure may be explosion-proof. The air received may be ambient air. The ambient air may be received in one of a number of ways, including but not limited to blowing (using, for example, a fan located outside the enclosure and bottom end of the filter assembly) the air toward the filter assembly, inducing air (using, for example, a fan located inside the enclosure and top end of the filter assembly) the air through the filter assembly, and inducing the air based on a pressure differential between the bottom end of the filter assembly and the top end of the filter assembly.

In Step 504, the air is passed through the filter assembly to generate controlled air. When the air passes through the filter assembly, the air is controlled. The air may be controlled in one or more of a number of ways, including but not limited to containing a fire, suppressing a fire, removing dust and other particles from the air, removing moisture from the air, and/or cooling the air. The air may be controlled by a filter within the filter assembly. The filter may control the air based on one or more features of the filter, including but not limited to the thickness of the filter, the density of the filter, and the material used for the filter.

In Step 506, the controlled air is passed through the top end of the filter assembly. The filter assembly may include, in addition to the filter, a housing that has a cavity. In such a case, the filter is positioned within the cavity and coupled to the housing. The filter assembly may also have a reinforcement structure coupled to the top end of the housing and adjacent to the top end of the filter.

The following description (in conjunction with FIGS. 1 through 5) describes an example in accordance with one or more embodiments of the invention. The example is for explanatory purposes only and is not intended to limit the scope of the invention. Terminology used in FIGS. 1 through 5 may be used in the example without further reference to FIGS. 1 through 5.

Example

Figure 6A:
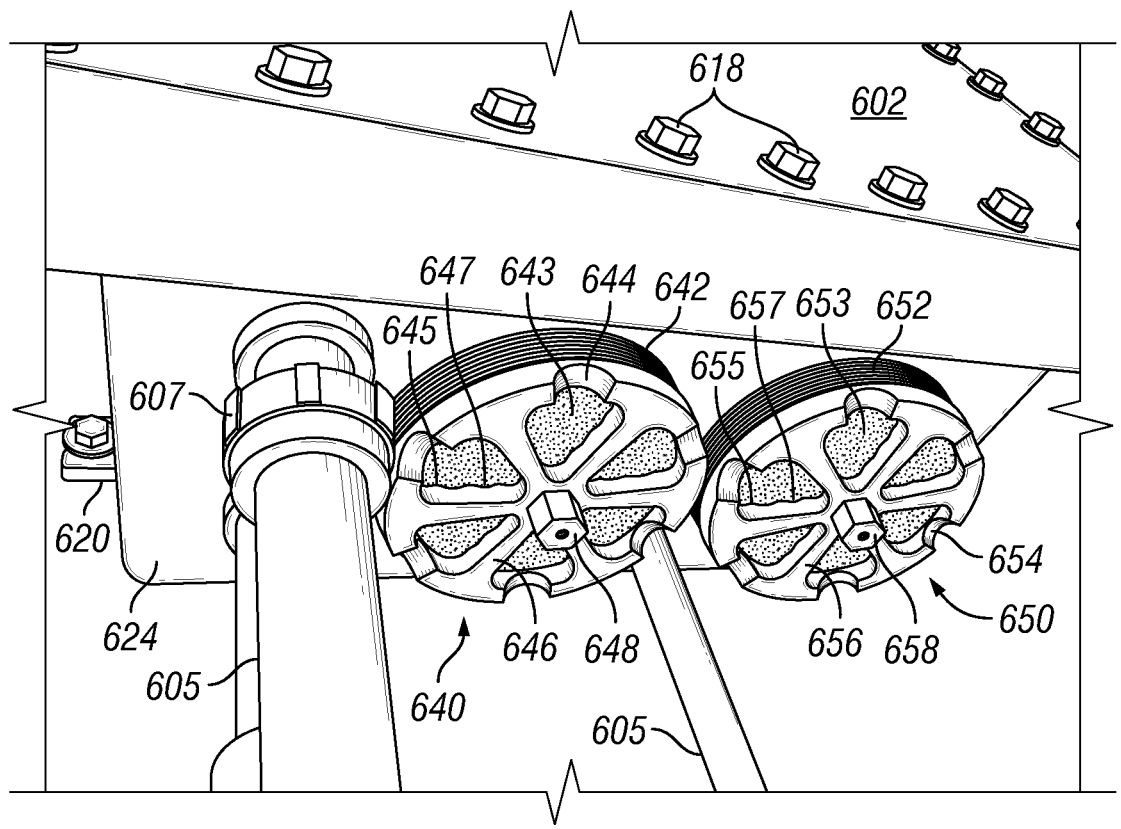
FIGS. 6A and 6B show an example in accordance with one or more embodiments of the invention.
Figure 6B:
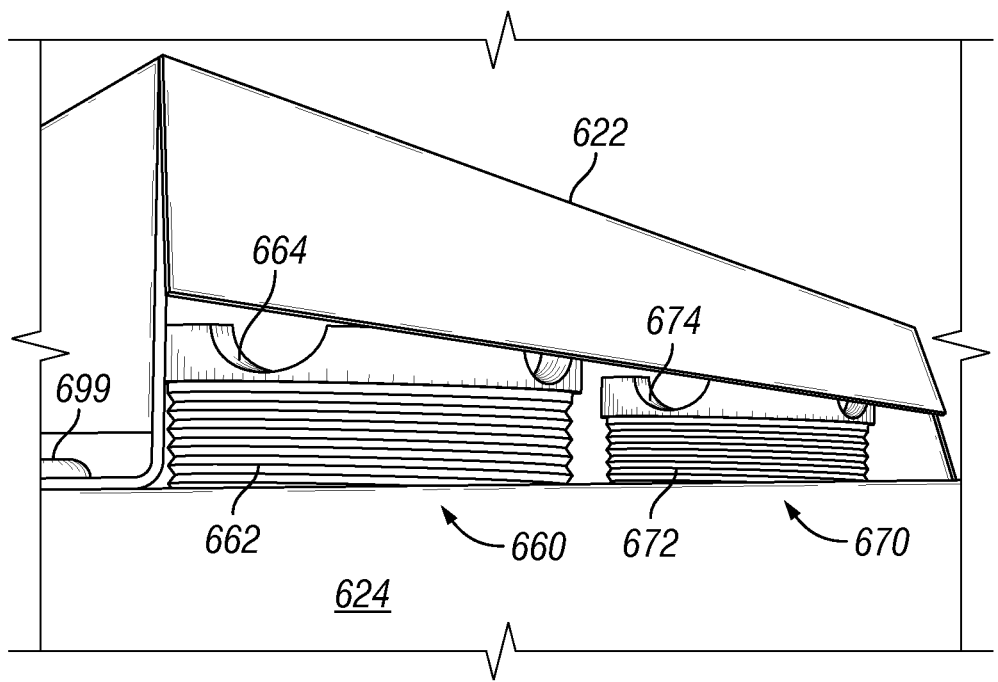

Consider the following example, shown in FIGS. 6A and 6B, which describes controlling air passing through a filter assembly in accordance with one or more embodiments described above. In the example, consider the scenario in which embodiments of the invention are used with an explosion-proof enclosure, as shown in FIGS. 6A and 6B.

In FIG. 6A, a view of the bottom portion of the enclosure, looking upward from below the enclosure, is shown. Specifically, the enclosure is closed, as evidenced by the fastening devices 618 that are used to secure the enclosure cover 602 to the enclosure body 624. The enclosure is mounted to a wall using mounting brackets 620. Further, cables are run through conduit 605 to terminate at one or more components inside the enclosure. The conduit 605 is coupled to the bottom end of the enclosure body 624 using a coupling 607.

The bottom end of the enclosure also is coupled to two filter assemblies, filter assembly 1 640 and filter assembly 2 650. Filter assembly 1 640 and filter assembly 2 650 are each substantially similar to the filter assembly described above with respect to FIGS. 3A through 3C. Specifically, filter assembly 1 640 includes threads (i.e., threads 1 642) on the outer surface of the housing, a filter (i.e., filter 1 643) that is positioned within a cavity of the housing and coupled to the housing, and a reinforcement structure.

The reinforcement structure of filter assembly 1 640 includes six reinforcement ribs (i.e., reinforcement ribs 1 646) that are joined in the center of the perimeter of the reinforcement structure atop filter 1 643. Further, a boss (i.e., boss 1 648) is positioned at the top center of the reinforcement structure where reinforcement ribs 1 646 join. The reinforcement structure also includes notches (i.e., notches 1 644) located along the perimeter of the reinforcement structure between two adjacent reinforcement ribs of reinforcement ribs 1 646. Each reinforcement rib of the reinforcement structure in filter assembly 1 640 has a number of rib contacts (i.e., rib contacts 1 645) that alternate with air gaps (i.e., air gaps 1 647).

Similarly, filter assembly 2 650 includes threads 2 652 on the outer surface of the housing, filter 2 653, and a reinforcement structure that includes reinforcement ribs 2 656 with rib contacts 2 655 alternating with air gaps 2 657, boss 2 658, and notches 2 654.

In this example, a pressure differential between the interior of the enclosure and the exterior of the enclosure induces air to be drawn from outside the enclosure through the filter assemblies (i.e., filter assembly 1 640 and filter assembly 2 650) to the interior of the enclosure. Consequently, in one or more embodiments of the invention, filter assembly 1 640 and filter assembly 2 650 are intake air filter assemblies, as described above. Filter assembly 1 640 and filter assembly 2 650 are shown protruding from the exterior of the bottom of the enclosure body 624. In one or more embodiments of the invention, filter assembly 1 640 and/or filter assembly 2 650 may be coupled flush with the exterior wall of the enclosure body 624. Likewise, inside the enclosure, filter assembly 1 640 and filter assembly 2 650 may each be coupled flush with the interior wall of the enclosure body 624 or protrude into the interior of the enclosure.

Further, as shown in FIG. 6A, filter assembly 1 640 and filter assembly 2 650 are each oriented such that the reinforcement structure encounters the intake air prior to filter 1 643 and filter 2 653. In other words, filter assembly 1 640 and filter assembly 2 650 are each oriented such that the reinforcement structure faces outward, away from the explosion-proof enclosure. In one or more embodiments of the invention, filter assembly 1 640 and filter assembly 2 650 may each be oriented such that the reinforcement structure is the last portion of the filter assembly to encounter the intake air.

By passing through filter assembly 1 640 and filter assembly 2 650, the contaminants (e.g., dust, moisture) may be removed from the intake air by passing through filter assembly 1 640 and filter assembly 2 650. Filter assembly 1 640 and filter assembly 2 650 may also prevent a fire or contain a fire within and/or outside the enclosure. Further, when one or more cooling mechanisms (e.g., heat exchanger) are added, the intake air may be cooled.

In FIG. 6B, a view of the top portion of the enclosure, looking downward from above the enclosure, is shown. The top end of the enclosure also is coupled to two filter assemblies, filter assembly 3 660 and filter assembly 4 670. Filter assembly 3 660 and filter assembly 4 670 are each substantially similar to the filter assembly described above with respect to FIGS. 3A through 3C. Specifically, as shown in FIG. 6B, filter assembly 3 660 includes threads (i.e., threads 3 662) on the outer surface of the housing, a filter (not shown) that is positioned within a cavity of the housing and coupled to the housing, and a reinforcement structure. The only part of the reinforcement structure of filter assembly 3 660 that is shown are notches 3 664.

Similarly, filter assembly 4 670 includes threads 4 672 on the outer surface of the housing, filter 4 673 (not shown), and a reinforcement structure that includes notches 4 674. In addition, a shroud 622 is coupled to the enclosure body 624 using one or more fastening devices (e.g., fastening device 699).

In this example, pressure differential forces exhaust air to pass through filter assembly 3 660 and filter assembly 4 670 from the interior of the enclosure to the exterior of the enclosure. Consequently, in one or more embodiments of the invention, filter assembly 3 660 and filter assembly 4 670 may be called exhaust air filter assemblies, as described above. Filter assembly 3 660 and filter assembly 4 670 are shown protruding from the exterior of the bottom of the enclosure body 624. In one or more embodiments of the invention, filter assembly 3 660 and filter assembly 4 670 may be coupled flush with the exterior wall of the enclosure body 624. Likewise, inside the enclosure, filter assembly 3 660 and filter assembly 4 670 may each be coupled flush with the interior wall of the enclosure body 624 or protrude into the interior of the enclosure.

Further, as shown in FIG. 6B, filter assembly 3 660 and filter assembly 4 670 are each oriented such that the reinforcement structure encounters the exhaust air after their respective filters. In other words, filter assembly 3 660 and filter assembly 4 670 are each oriented such that the reinforcement structure faces outward, away from the explosion-proof enclosure. In one or more embodiments of the invention, filter assembly 3 660 and filter assembly 4 670 may each be oriented such that the reinforcement structure is the first portion of the filter assembly to encounter the exhaust air.

By passing through filter assembly 3 660 and filter assembly 4 670, the exhaust air may be cooled. Further, the contaminants (e.g., dust, moisture) may be removed from the exhaust air by passing through filter assembly 3 660 and filter assembly 4 670. Filter assembly 3 660 and filter assembly 4 670 may also prevent a fire or contain a fire within and/or outside the enclosure.

Embodiments of the present invention provide for improving the effectiveness and longevity of filter assemblies used with enclosures. Specifically, embodiments of the invention are configured to filter air in extreme conditions. The extreme conditions may be associated with, for example, temperature, pressure, moisture, fire, and/or air flow. The reinforcement structure disclosed herein helps the filter and other components of the filter assembly to retain their shape and operating effectiveness under one or more extreme conditions. In such extreme conditions, the enclosure may be an explosion-proof enclosure that is used with embodiments of the invention.

Although the inventions are described with reference to preferred embodiments, it should be appreciated by those skilled in the art that various modifications are well within the scope of the invention. From the foregoing, it will be appreciated that an embodiment of the present invention overcomes the limitations of the prior art. Those skilled in the art will appreciate that the present invention is not limited to any specifically discussed application and that the embodiments described herein are illustrative and not restrictive. From the description of the exemplary embodiments, equivalents of the elements shown therein will suggest themselves to those skilled in the art, and ways of constructing other embodiments of the present invention will suggest themselves to practitioners of the art. Therefore, the scope of the present invention is not limited herein.

What is claimed is:

1. A porous media assembly for controlling air passing therethrough, the porous media assembly comprising:
   a housing comprising a cavity formed therein, wherein the housing is disposed within an aperture of an enclosure, wherein the enclosure is suitable for potentially explosive environments, and wherein the housing and the enclosure are configured to form a flame path where the housing and the enclosure join;
   a porous media positioned within the cavity and coupled to the housing; and
   a reinforcement structure coupled to an end of the housing and adjacent to a top end of the porous media.

2. The porous media assembly of claim 1, wherein the housing further comprises an exterior surface, wherein the exterior surface comprises threads for mating with corresponding threads disposed on a perimeter of the aperture of the enclosure.

3. The porous media assembly of claim 2, wherein the porous media comprises sintered material.

4. The porous media assembly of claim 1, wherein the porous media has a density sufficient to allow at least 0.01 cubic feet per minute of the air to pass through.

5. The porous media assembly of claim 1, wherein the reinforcement structure comprises at least one rib extending inward from a perimeter of the reinforcement structure towards a center of the perimeter along the top end of the porous media.

6. The porous media assembly of claim 5, wherein the at least one rib comprises at least one contact point in contact with the top end of the porous media.

7. The porous media assembly of claim 6, wherein the at least one rib further comprises at least one elevated portion adjacent to the at least one contact point, wherein the at least one elevated portion creates an air gap between the top end of the porous media and the at least one rib.

8. The porous media assembly of claim 5, wherein at least two ribs are joined at the center of the perimeter of the reinforcement structure by a boss, wherein the boss is configured to facilitate rotational movement of the porous media assembly.

9. The porous media assembly of claim 8, wherein the boss is further configured to receive a fastening device, wherein the fastening device couples a shroud to the porous media assembly, wherein the shroud is configured to cover portions of the porous media assembly that are external to the enclosure.

10. The porous media assembly of claim 1, wherein the porous media comprises a bottom end, wherein the bottom end of the porous media is coupled to an inner surface of the housing in the cavity.

11. The porous media assembly of claim 10, wherein the porous media is coupled to the inner surface of the housing in the cavity by at least one selected from a group consisting of welding, using epoxy, brazing, press fitting, mechanically connecting, threading, using a flat joint, and using a serrated joint.

12. The porous media assembly of claim 1, wherein the reinforcement structure is welded to the housing.

13. The porous media assembly of claim 1, wherein the reinforcement structure includes at least one notch for draining fluid from the top end of the porous media, wherein the at least one notch is located along a perimeter of the reinforcement structure.

14. The porous media assembly of claim 1, wherein the reinforcement structure is constructed of a material selected from at least one of a group consisting of steel, aluminum, plastic, and an alloy metal.

15. The porous media assembly of claim 1, wherein the controlling the air passing through the porous media assembly comprises at least one selected from a group consisting of containing a fire, suppressing a fire, removing dust and other particles from the air, removing moisture from the air, and cooling the air.

16. A method for controlling air passing through a porous media assembly, the method comprising:
    receiving the air at a first porous media assembly end;
    passing the air through the porous media assembly to generate controlled air; and
    passing the controlled air through a second porous media assembly end,
    wherein the porous media assembly comprises:
       a housing comprising a cavity formed therein, wherein the housing is disposed within an aperture of an enclosure, wherein the enclosure is suitable for potentially explosive environments, and wherein the housing and the enclosure are configured to form a flame path where the housing and the enclosure join;
       a porous media positioned within the cavity and coupled to the housing; and
       a reinforcement structure coupled to a housing end and adjacent to at least one of the porous media ends.

17. The method of claim 16, wherein the housing further comprises an exterior surface, wherein the exterior surface comprises threads for mating with corresponding threads disposed on a perimeter of the aperture of the enclosure, and wherein the porous media comprises sintered material.

18. The method of claim 16, wherein the reinforcement structure comprises at least one rib extending inward from a perimeter of the reinforcement structure towards a center of the perimeter along the at least one of the porous media ends, wherein the at least one rib comprises:
   at least one contact point in contact with the at least one of the porous media ends; and
   at least one elevated portion adjacent to the at least one contact point, wherein the at least one elevated portion creates an air gap between the at least one of the porous media ends and the at least one rib.

19. The method of claim 16, wherein the first porous media assembly end is a bottom of the porous media assembly, and wherein the second porous media assembly end is a top of the porous media assembly.

20. The method of claim 16, wherein the second porous media assembly end is adjacent to the at least one of the porous media ends and the housing end.

* * * * *